US012622441B2

(12) United States Patent
Zhao et al.

(10) Patent No.: US 12,622,441 B2
(45) Date of Patent: May 12, 2026

(54) MAGNETIC FIELD FRESHNESS-PRESERVING STORAGE CONTAINER AND REFRIGERATOR

(71) Applicants: QINGDAO HAIER REFRIGERATOR CO., LTD., Qingdao (CN); HAIER SMART HOME CO., LTD., Qingdao (CN)

(72) Inventors: Yanfeng Zhao, Qingdao (CN); Mengcheng Li, Qingdao (CN); Bin Fei, Qingdao (CN); Xiaobing Zhu, Qingdao (CN); Lisheng Ji, Qingdao (CN); Yuning Zhang, Qingdao (CN); Yao Yi, Qingdao (CN); Tao Li, Qingdao (CN); Zilin Cao, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 89 days.

(21) Appl. No.: 18/682,661

(22) PCT Filed: Jul. 21, 2022

(86) PCT No.: PCT/CN2022/107159
§ 371 (c)(1),
(2) Date: Feb. 9, 2024

(87) PCT Pub. No.: WO2023/016224
PCT Pub. Date: Feb. 16, 2023

(65) Prior Publication Data
US 2024/0358046 A1      Oct. 31, 2024

(30) Foreign Application Priority Data
Aug. 11, 2021     (CN) ......................... 202110919004.X

(51) Int. Cl.
*A23B 2/60* (2025.01)
*F25D 23/12* (2006.01)
*F25D 25/02* (2006.01)

(52) U.S. Cl.
CPC ................ *A23B 2/60* (2025.01); *F25D 23/12* (2013.01); *F25D 25/025* (2013.01)

(58) Field of Classification Search
CPC ......... F25D 23/12; F25D 25/025; A23B 2/60; H01F 7/064; H01F 27/306
See application file for complete search history.

(56) References Cited

U.S. PATENT DOCUMENTS

2009/0097693 A1*   4/2009   Croft, III ............... H04R 9/047
381/399
2013/0160467 A1     6/2013   Hall et al.

FOREIGN PATENT DOCUMENTS

CN               1500441 A        6/2004
CN            101123369 A        2/2008
(Continued)

OTHER PUBLICATIONS

Nemkov, V. et al. 'Design Study of Induction Coil for Generating Magnetic Field for Cancer Hyperthermia Research'. Compel: Int J for Computation and Maths. in Electrical and Electronic Eng., vol. 30, 2011, [retrieved on Jul. 10, 2025]. (Year: 2011). Retrieved from Internet <https://www.researchgate.net/publication/233492782_Magnetic_field_generating_inductor_for_cancer_hyperthermia_research> (Year: 2011).*
(Continued)

*Primary Examiner* — Elizabeth J Martin
*Assistant Examiner* — Keona Lauren Banks
(74) *Attorney, Agent, or Firm* — MUNCY, GEISSLER, OLDS & LOWE, P.C.

(57) ABSTRACT
A magnetic field freshness-preserving storage container (200) includes a storage assembly (210), in which a storage
(Continued)

space for holding a stored object is defined; and one or more magnetic field assemblies (201) respectively sleeved on the periphery of the storage assembly (210). Each magnetic field assembly (201) comprises: one or more magnetic components (220) arranged on an outer side of the storage assembly (210) and used to form a magnetic field in the storage space; and an annular magnetically conductive component (230), which comprises uniform magnetization plates (231) arranged corresponding to the magnetic components (220), and connecting straps (232) connected to the uniform magnetization plates (231) and arranged around the periphery of the storage assembly (210), the uniform magnetization plates (231) and the connecting straps (232) forming an annular magnetic conduction path outside the storage space.

8 Claims, 6 Drawing Sheets

(56) References Cited

FOREIGN PATENT DOCUMENTS

| CN | 103860178 | A | | 6/2014 | |
| CN | 205845630 | U | | 12/2016 | |
| CN | 207010960 | U | | 2/2018 | |
| CN | 107062752 | B | * | 5/2019 | .............. F25D 11/02 |
| CN | 109737665 | A | | 5/2019 | |
| CN | 111503984 | A | * | 8/2020 | .............. A23B 2/60 |
| CN | 212409196 | U | | 1/2021 | |
| CN | 213514582 | U | | 6/2021 | |
| CN | 113192719 | A | * | 7/2021 | .............. H01F 7/20 |
| CN | 216114964 | U | | 3/2022 | |
| CN | 216114965 | U | | 3/2022 | |
| JP | 2003139460 | A | | 5/2003 | |
| JP | 2005061729 | A | | 3/2005 | |
| JP | 2007014326 | A | | 1/2007 | |
| JP | 2009041807 | A | | 2/2009 | |
| WO | WO2020073740 | A | | 4/2020 | |

OTHER PUBLICATIONS

Zhang et al. (CN111503984A) English Translation (Year: 2020).*
Wang et al. (CN107062752B) English Translation (Year: 2019).*
Yang (CN113192719A) English Translation (Year: 2021).*

* cited by examiner

MAGNETIC FIELD FRESHNESS-PRESERVING STORAGE CONTAINER AND REFRIGERATOR

TECHNICAL FIELD

The present invention relates to a refrigeration and freezing equipment, and in particular, to a magnetic field freshness-preserving storage container and a refrigerator.

BACKGROUND

There is increasing attention to the freshness preservation of subjects stored in refrigerators. Food materials, such as meat, fishes and shrimps, are prone to lose juice to worsen a taste and darken a color during storage. In particular, some high-grade food materials have greatly reduced quality after stored for a period of time.

To improve the quality of storage subjects, several advancements have been introduced in existing technologies, but some are not ideally effective in preserving freshness, and others are costly, thereby making them impractical for household refrigerators. In these improvements, theoretical research has found that magnetic fields significantly influence the formation of ice crystals during the freezing process. The field of refrigeration has actively explored incorporating magnetic fields into fresh-keeping storage, however when use in refrigerators, providing sufficient magnetic field strength in refrigerators requires a large amount of magnetic material, leading to high costs and increased product weight.

SUMMARY

An object of the present invention is to provide a magnetic field freshness-preserving storage container and a refrigerator that effectively improves storage quality while reducing component costs.

A further object of the present invention is to facilitate the installation and application of the magnetic field freshness-preserving storage container in refrigerators.

In particular, the present invention is directed to a magnetic field freshness-preserving storage container, comprising:

a storage assembly defining a storage space for placing storage subjects;

one or more magnetic field assemblies surrounding the storage assembly, and each magnetic field assembly comprising:

one or more magnetic components positioned outside the storage assembly to form a magnetic field in the storage space;

an annular magnetically conductive component having uniform magnetization plates corresponding to the magnetic components and connecting straps connected to the uniform magnetization plates and arranged around the periphery of the storage assembly, the uniform magnetization plates and the connecting straps forming an annular magnetic conduction path outside the storage space.

Further, each magnetic component comprises:

an electromagnetic coil having electromagnetic wire coils wound internally along an annular circumference, and when electrified, the electromagnetic wire coils generating an electromagnetic field in the storage space; and the uniform magnetization plates positioned at a central through-hole of the corresponding electromagnetic coil, and uniform magnetization plates matching the central through-hole's shape, or abutting against the electromagnetic coil.

Further, each magnetic field assembly has two magnetic components on opposite sides of the storage assembly, and the annular magnetically conductive component defines a pair of uniform magnetization plates at corresponding positions of the two magnetic components.

Further, the connecting straps include two segments of connecting straps, and each connecting strap extends from an edge of the uniform magnetization plate on one side to an edge of the uniform magnetization plate on the other side along the storage assembly's outer wall.

Further, there is one magnetic field assembly, and the shapes of two magnetic components of the magnetic field assembly is matched with the shape of the side surfaces of the storage assembly which the magnetic components are placed on.

Further, the storage assembly is flat, and two magnetic components are positioned at top and bottom sides respectively.

Further, multiple magnetic field assemblies are spaced apart from each other along a depth direction or a height direction of the storage assembly.

Further, each magnetic field assembly has one magnetic component, and the magnetic components of two adjacent magnetic field assemblies are disposed on opposite sides of the storage assembly.

Further, the storage assembly comprises:

a cylindrical body having a forward opening; and a drawer, slidably positioned in the cylindrical body, and forming the storage space therein.

The present invention is further directed to a refrigerator comprising:

a cabinet defining a storage compartment;

the aforementioned magnetic field freshness-preserving storage container positioned inside the storage compartment.

The magnetic field freshness-preserving storage container of the present invention comprises one or more magnetic field assemblies surrounding the storage assembly, thereby creating a magnetic field in the storage space. The magnetic field can help improve storage quality and shorten freezing time, thereby reducing juice and nutrient loss, decreasing microorganism and bacteria counts, and extending the freshness period. Each magnetic field assembly comprises one or more magnetic components and an annular magnetically conductive component that connects the magnetic components to form an annular magnetic conduction path surrounding the storage space. The annular magnetic conduction path reduces the amount of magnetic material needed, thereby avoiding cost increases and weight gain from using excessive or oversized magnetic components.

Furthermore, in the magnetic field freshness-preserving storage container of the present invention, a magnetic field is formed when the magnetic components are electrified by utilizing electromagnetic coils. Correspondingly, the uniform magnetization plate is designed to work with the electromagnetic coils, and placed at the corresponding electromagnetic coil's central through-hole or abutted against the electromagnetic coil. It homogenizes the coil's magnetic field and further serves as part of the magnetic conduction path, thereby enhancing the magnetic flux density in the storage space and improving magnetic field efficiency.

Moreover, the magnetic field freshness-preserving storage container of the present invention, through structural optimization of the magnetic field assemblies, achieves a more compact design, especially suitable for storage boxes and drawers, implementing magnetic field preservation in relatively flat storage spaces. The magnetic field assemblies have various optional structures, selected based on the structural characteristics of the storage assembly, thereby enhancing usability and adjustment flexibility.

Furthermore, the refrigerator of the present invention comprises the aforementioned magnetic field freshness-preserving storage container, thereby allowing ingredients to be stored in a magnetic field environment. This inhibits the growth of ice crystal nuclei and ensures that ice crystal growth rate exceeds water molecule migration rate, thereby resulting in smaller ice crystals. This minimizes cellular damage and juice loss, ensuring better taste and improving frozen storage quality, and meeting user demands for the storage quality of valuable ingredients.

Additionally, by improving storage quality through magnetic fields, the present invention provides a new preservation function for smart refrigerators, conforming to increasing user demands for smart refrigerators and fulfilling user expectations for smart homes and lifestyles.

The above and other objects, advantages and features of the present invention will become more apparent to those skilled in the art from the following detailed description of specific embodiments thereof taken in conjunction with the accompanying drawings.

BRIEF DESCRIPTION OF THE DRAWINGS

Some specific embodiments of the invention will be described in detail hereinafter by way of example and not by way of limitation with reference to the accompanying drawings. The same reference numerals identify the same or similar components or parts in the drawings. Those skilled in the art should appreciate that the drawings are not necessarily drawn to scale. In the drawings.

DETAILED DESCRIPTION

Figure 1:
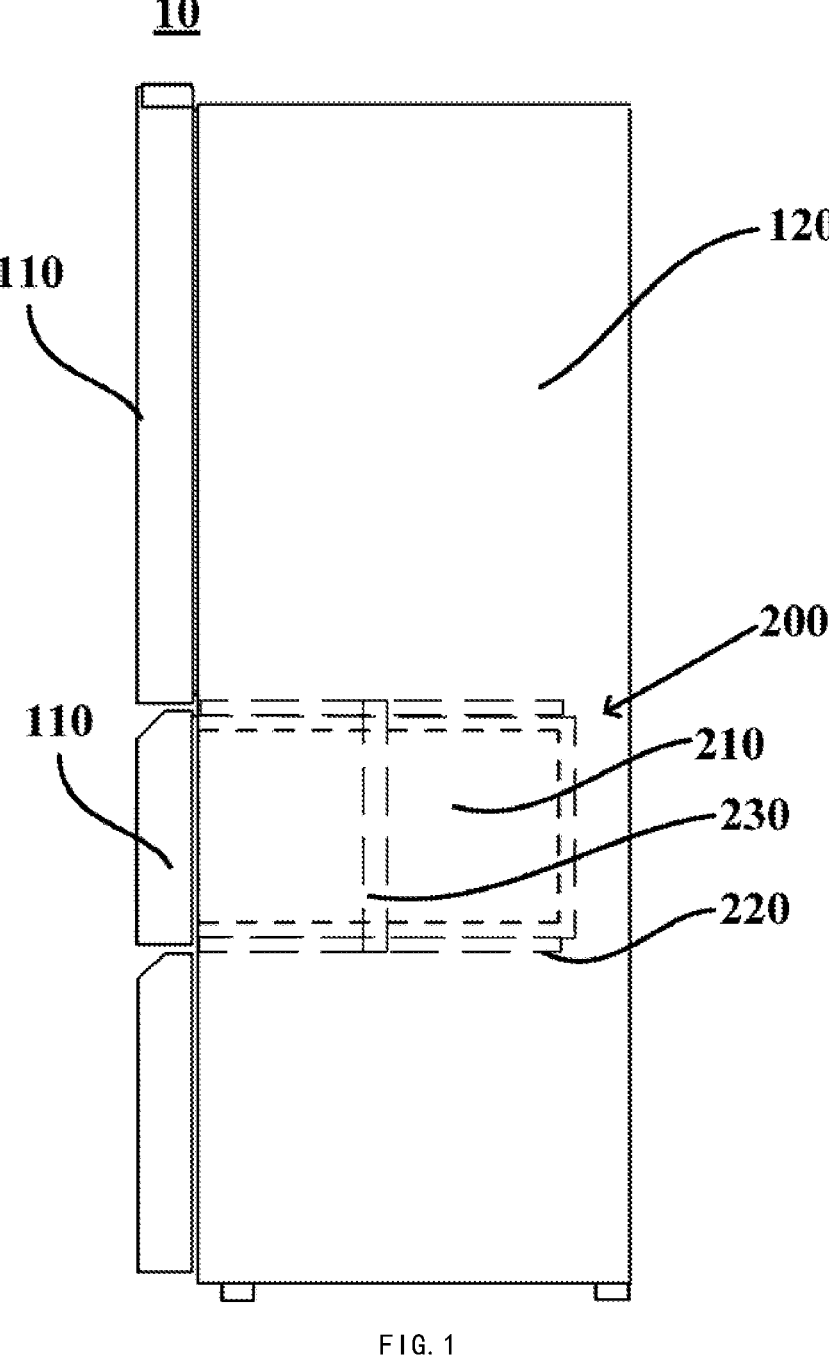
FIG. 1 is a schematic perspective view of a refrigerator with a magnetic field freshness-preserving storage container according to an embodiment of the present invention.

FIG. 1 illustrates a schematic perspective view of a refrigerator 10 with a magnetic field freshness-preserving storage container 200 according to an embodiment of the present invention. Generally, the refrigerator 10 of the present embodiment comprises a cabinet 120, a door 110, and a refrigeration system (not shown). The cabinet 120 defines at least one storage compartment with an open front side, typically multiple chambers such as refrigerating storage compartments, freezing storage compartments, variable temperature storage compartments, etc. The number and functionality of specific storage compartments can be configured according to predetermined requirements.

The refrigerator 10 according to the present embodiment can be configured as an air-cooled refrigerator, an air path system is provided in the cabinet 120, and by a fan, refrigerating airflow subjected to heat exchange by a heat exchanger (evaporator) is fed to the storage compartment through an air supply port, and then returned to an air duct through an air return port. Refrigeration is realized. Since the cabinet 120, the door 110, and the refrigerating system of such a refrigerator are well known and easily implemented by those skilled in the art, in order to avoid covering and obscuring invention points of the present application, the cabinet 120, the door 110, and the refrigerating system are not repeated hereinafter.

One or more storage compartments inside the refrigerator 10 can be equipped with a magnetic field freshness-preserving storage container 200. When placed in the freezing storage compartment, the magnetic field freshness-preserving storage container 200 can be configured to perform freezing freshness retaining on frozen food materials, and growth of ice crystal nuclei is inhibited, such that a growth rate of ice crystals is higher than a migration rate of water molecules, and the generated ice crystals are smaller, thereby reducing damage to cells, avoiding juice loss, accelerating a freezing process and shortening a freezing time. When used for the refrigerating storage compartment, the magnetic field freshness-preserving storage container 200 can reduce a speed of an oxidation-reduction reaction of the food materials, reduce loss of nutrition and water, prevent the food materials from discoloring, inhibit bacteria from breeding and prolong a freshness retaining period of the food materials.

The number of the magnetic field freshness-preserving storage containers 200 and a type of the storage compartment where the magnetic field freshness-preserving storage containers can be arranged can be configured according to needs of users. For example, one or more magnetic field freshness-preserving storage containers 200 can be provided in the refrigerator 10. The magnetic field freshness-preserving storage container 200 can be positioned in the refrigerating storage compartment, freezing storage compartment, variable temperature storage compartment, or can be an independent chamber in the refrigerator 10.

Figure 2:
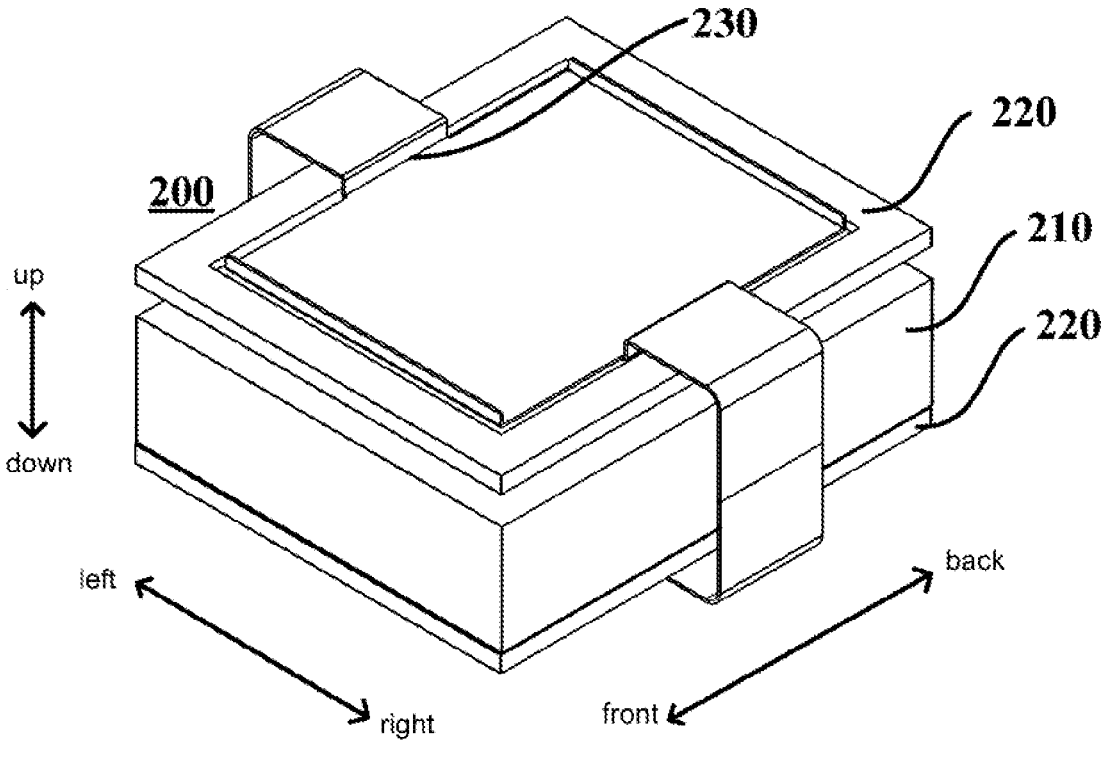
FIG. 2 is a schematic diagram of the magnetic field freshness-preserving storage container according to an embodiment of the present invention.
Figures 3, 4:
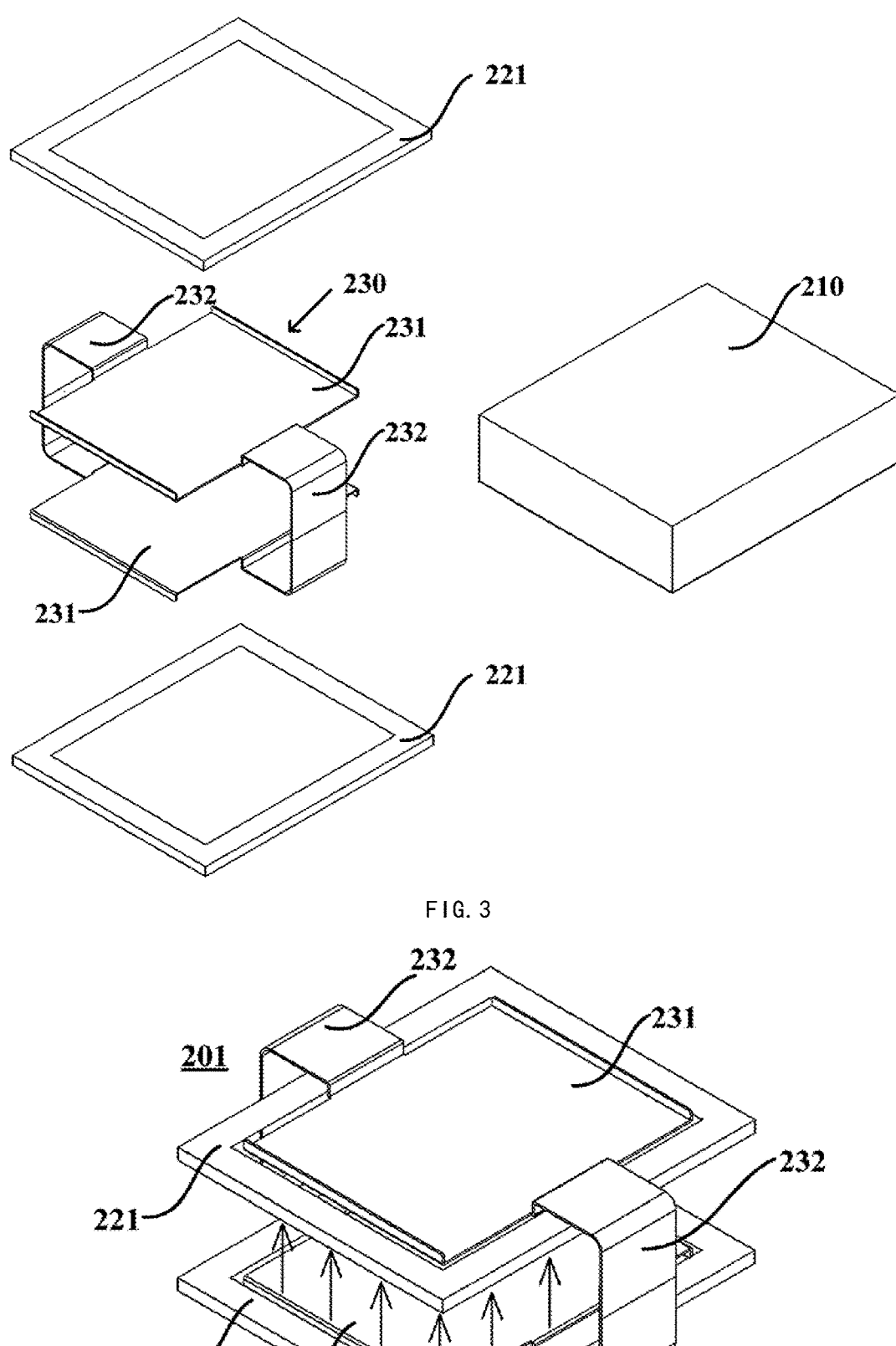
FIG. 3 is an exploded view of the magnetic field freshness-preserving storage container shown in FIG. 2.
FIG. 4 is a schematic diagram showing the magnetic field assemblies and the magnetic field directions thereof in the magnetic field freshness-preserving storage container of FIG. 2.

FIG. 2 is a schematic diagram of the magnetic field freshness-preserving storage container 200 according to an embodiment of the present invention; FIG. 3 is an exploded view of the components of the magnetic field freshness-preserving storage container 200 shown in FIG. 2; FIG. 4 is a schematic diagram showing the magnetic field assemblies 201 and their magnetic field directions in the magnetic field freshness-preserving storage container 200 of FIG. 2.

The magnetic field freshness-preserving storage container 200 generally comprises a storage assembly 210 and one or more magnetic field assemblies 201. The storage assembly 210 defines a storage space for placing storage subjects and can be box-shaped. In some embodiments, the storage assembly 210 can be a generally flat rectangular shape (i.e., its height is significantly less than its depth and width). The storage assembly 210 can be a drawer structure, comprising a cylindrical body with a front opening and a drawer that can be slidably placed inside the cylindrical body. When the drawer is pulled out, it reveals the storage space for easy access to storage subjects. When the drawer is pushed into the cylindrical body, it forms an independent sealed space. The structure of the drawer itself for the refrigerator is known to technicians in the field, and will not be repeated here.

Each magnetic field assembly 201 comprises one or more magnetic components 220 and an annular magnetically conductive component 230. The magnetic components 220 are positioned outside the storage assembly for creating a magnetic field in the storage space. The magnetic components 220 can be permanent or electromagnetic. In some optional embodiments, the magnetic components 220 include both a permanent magnet component and an electromagnetic component, using the permanent magnet component to provide the underlying permanent magnetic field, and when the electromagnetic component energized, an electromagnetic field superimposed with the permanent magnet field can be formed. The range of magnetic field strength can be set in 1 Gs to 100 Gs. In applications in a freezing environment, the range of magnetic field strength can preferably be in 5 Gs to 60 Gs, for example, about 20 Gs; in applications in a refrigerated environment, the range of magnetic field strength can be in 20 Gs to 160 Gs, preferably 40 Gs to 80 Gs, for example, about 60 Gs.

The annular magnetically conductive component 230 comprises uniform magnetization plates 231 corresponding to the magnetic components 220 and connecting straps 232 linked to the uniform magnetization plate 231 and arranged around the periphery of the storage assembly 210. This structure forms an annular magnetic conduction path outside the storage space. The annular magnetically conductive component 230 can be made from materials with low coercivity and high magnetic permeability, which creates a magnetic conduction path that can be used to aggregate the magnetic field and improve the uniformity of the magnetic field within the storage space, while at the same time reducing the release of the magnetic field to the outside, and reducing the interference with other components on the outside of the storage assembly 210 (e.g., to avoid magnetizing other components, etc.). The annular magnetically conductive component 230 can be made from silicon steel sheets or similar materials.

The annular magnetically conductive component 230 can be a single piece, with the uniform magnetization plates 231 and connecting straps 232 formed integrally. In some embodiments, the uniform magnetization plates 231 and connecting straps 232 can be jointed together.

The uniform magnetization plate 231 is corresponding to the corresponding magnetic component 220, thereby ensuring a more uniform magnetic field distribution in the storage space.

The magnetic components 220 can comprise electromagnetic coils 221, the electromagnetic coil 221 has electromagnetic wire coils wound internally along an annular circumference, and when electrified, the electromagnetic wire coils generating an electromagnetic field in the storage space.

The electromagnetic coil 221 can be circular, oval, or square in shape, typically flat with both top and bottom being planar, and its thickness significantly smaller than its perimeter dimensions. The width-to-thickness ratio of the electromagnetic coil 221 can be set between 1 to 10.

In some embodiments, the uniform magnetization plate 231 is placed at a central through-hole of the electromagnetic coil 221, and the uniform magnetization plate 231 is matching the central through-hole's shape, thus, the space occupied by the magnetic field assembly 201 is smaller, and the structure of the magnetic field freshness-preserving storage container 200 is more compact.

In other embodiments, the uniform magnetization plate 231 is abutting against the electromagnetic coil 221. The dimensions of the uniform magnetization plate 231 is larger than the outer dimensions of the electromagnetic coil 221, the electromagnetic coil 221 and the uniform magnetization plate 231 are centrally arranged, thereby expanding the magnetic field range.

Each magnetic field assembly 201 comprises two magnetic components 220 positioned on opposite sides of the storage assembly 210, and the annular magnetically conductive component 230 defines a pair of uniform magnetization plates 231 at corresponding positions of the two magnetic components 220. The placement of the magnetic components 220 depends on the construction of the respective sides. Generally, they are positioned opposite the center of each side, such as on the lateral, top and bottom, or front and back sides. The magnetic poles of the magnetic components 220 face the storage space, thereby allowing the magnetic field to permeate through the storage space.

In embodiments when the storage assembly 210 is a flat, rectangular shape (with height significantly less than depth and width), magnetic components 220 are preferably placed at the top and bottom sides of the storage assembly 210. That is to say, the storage assembly 210 is flat, the two magnetic components 220 are disposed at top and bottom sides of the storage assembly 210 respectively, thereby allowing the magnetic field to traverse from top to bottom or from bottom to top. This arrangement reduces the distance between the two magnetic components 220, thereby enhancing the strength and uniformity of the magnetic field.

The magnetic components 220 on both sides can have similar constructions and dimensions to ensure uniformity of the magnetic field. The magnetic field of the magnetic part 220 must ensure that a uniform magnetic field can be formed at all locations of the storage space. That is, the storage space is within the magnetic field without dead ends.

The projection of the storage space on the plane of the uniform magnetization plate 231 is within the range of the uniform magnetization plate 231, with the size of the magnetic component 220 being smaller than or equal to their respective opposite uniform magnetization plate 231. This means the uniform magnetization plate 231 can be equal to or slightly larger than the corresponding side of the storage assembly 210. In embodiments when the magnetic components 220 are set on the top and bottom side of the storage assembly 210, the uniform magnetization plate 231 corresponding to the top magnetic component 220 covers the top surface of the storage space, while the uniform magnetization plate 231 corresponding to the bottom magnetic component 220 covers the bottom surface.

The uniform magnetization plates 231 expand the magnetic field's coverage and ensure its uniformity. The connecting straps 232 include two segments of connecting straps 232, and each connecting strap 232 extends from an edge of the uniform magnetization plate 231 on one side to an edge of the uniform magnetization plate 231 on the other side along an outer wall of the storage assembly 210.

In embodiments with magnetic components 220 placed on the top and bottom walls of the storage assembly 210, one segment of the connecting strap 232 extends from the middle of one lateral side (e.g., right side) of the top uniform magnetization plate 231 along one side wall of the storage space to the middle of the corresponding side (e.g., right side) of the bottom uniform magnetization plate 231. The other section extends from the middle of the opposite lateral side (e.g., left side) of the top plate to the opposite side (e.g., left side) of the bottom plate.

The connecting straps 232 are strip-shaped, with a width along a front-and-back depth direction between half to one-tenth of a length of the uniform magnetization plates 231 in the same direction. That is, the connecting strap 232 can be set in the middle of the front-and-back direction of the uniform magnetization plate 231, and is significantly narrower than the uniform magnetization plate 231. This structure of the annular magnetically conductive component 230 reduces the use of magnetic materials and components, saving costs for the magnetic field freshness-preserving storage container 200 and reducing the overall weight of both the container 200 and the refrigerator 10.

In the embodiments shown in FIGS. 2 to 4, there is one magnetic field assembly 201, with its two magnetic components 220 shaped to match the sides of the storage assembly 210 which they are placed on. For instance, the top magnetic component 220 matches the top surface of the storage assembly 210, and the bottom magnetic component 220 matches the bottom surface. The uniform magnetization plate 231 on the top side is positioned above the top magnetic component 220, and the uniform magnetization plate 231 on the bottom side is positioned below the bottom magnetic component 220. The uniform magnetization plate 231 on the top side covers the top surface of the storage space, the uniform magnetization plate 231 on the bottom side covers the bottom surface of the storage space. A longitudinal magnetic field without dead ends is formed in the storage space. The connecting straps 232 are centrally positioned in the front-and-back direction of the magnetic field assembly 201, thereby forming a magnetic conductor path outside the storage space to prevent magnetic field leakage.

The magnetic field direction of the two magnetic parts 220 is set to the same, so that a uniform magnetic field is formed in the storage space. That is, the N pole of the two magnetic components 220 is in the same direction, and the S pole is in the opposite direction. The magnetic field direction in the storage space can be from bottom to top or from bottom to top. The magnetic field direction shown in FIG. 4 is from bottom to top. Based on the same technical idea, it is easy for technicians in this field to realize the magnetic field in the opposite direction by adjusting the magnetic pole direction, that is, to realize the magnetic field from top to bottom.

Based on these embodiments with magnetic components 220 and uniform magnetization plates 231 at the top and bottom sides, it is easy for technicians in this field to realize the scheme that the magnetic components 220 and uniform magnetization plate 231 are arranged on the left and right walls and the front and rear side walls respectively. Considering that electromagnetic coils 221 can generate heat when powered, the distance between the magnetic components and the stored subjects in the storage space should be at least 1 mm.

Figure 5:
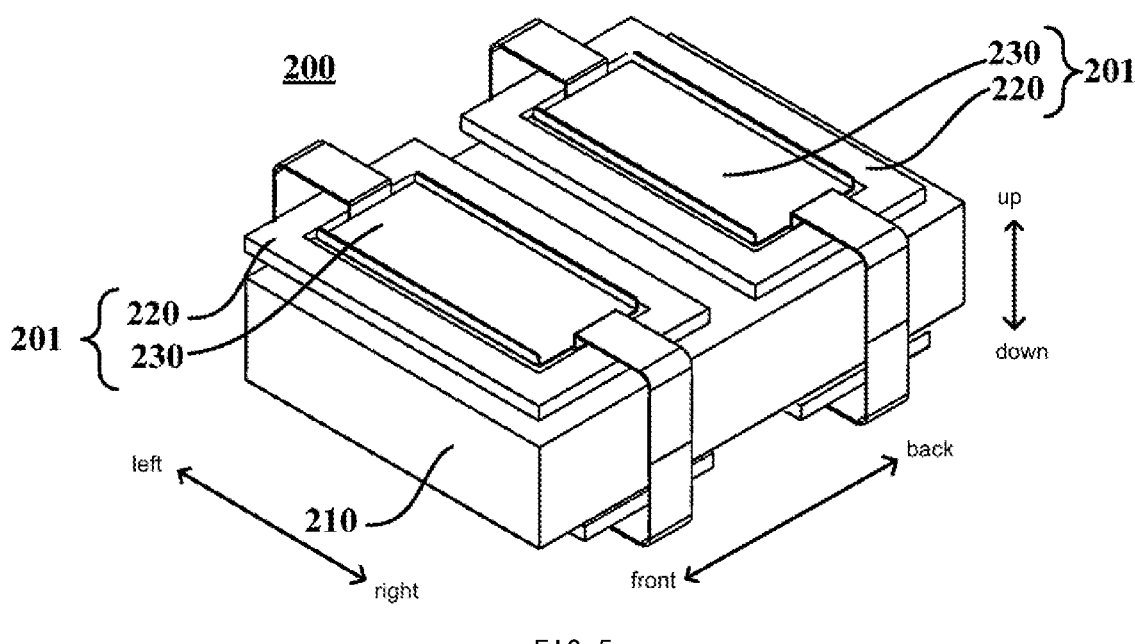
FIG. 5 is a schematic diagram of a magnetic field freshness-preserving storage container according to another embodiment of the present invention.
Figure 6:
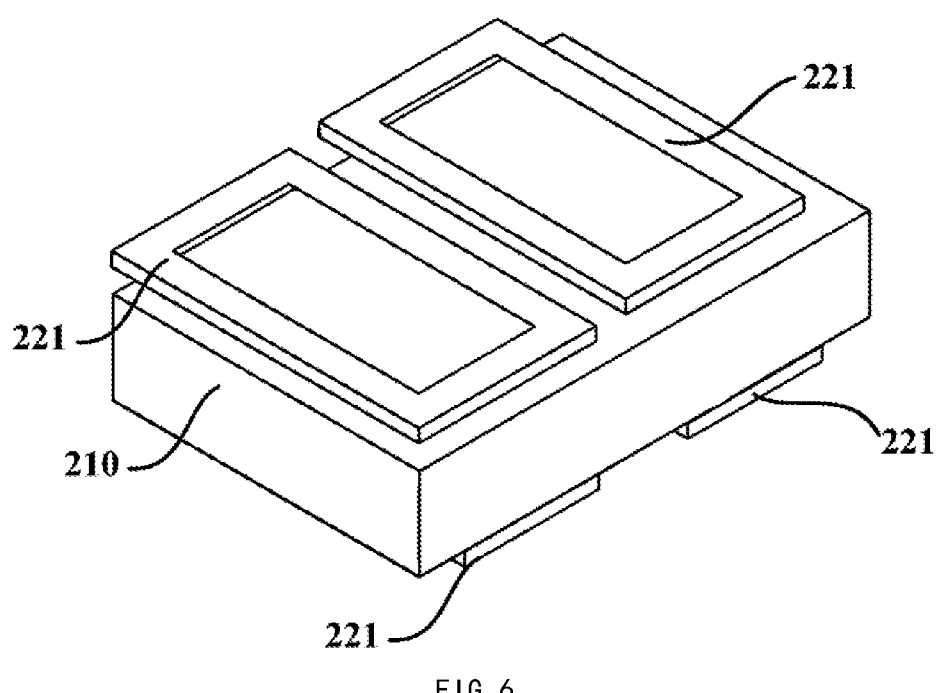
FIG. 6 is a schematic diagram showing the arrangement of electromagnetic coils in the magnetic field freshness-preserving storage container of FIG. 5.

FIG. 5 illustrates a magnetic field freshness-preserving storage container 200 according to another embodiment of the invention, while FIG. 6 shows the arrangement of electromagnetic coils 221 in the magnetic field freshness-preserving storage container. In this embodiment, multiple magnetic field assemblies 201 are spaced apart from each other along either the depth or height direction of the storage assembly 210, each magnetic field assembly 200 still comprises two magnetic components 220. The magnetic components 220 can be placed on opposite sides of the storage assembly 210, the annular magnetically conductive components 230 is provided with a uniform magnetization plate 231 respectively at the corresponding positions of the two magnetic members 220.

For structures with magnetic field assemblies 201 spaced along the depth of the storage assembly 210, magnetic components 220 can be placed on the lateral or top and bottom sides. Multiple magnetic field assemblies 201 create overlapping magnetic fields, thereby enhancing uniformity in the storage space.

In structures when magnetic field assemblies 201 are spaced along the height direction of the storage assembly 210, magnetic components 220 can be placed on the lateral or front and back sides.

Magnetic components 220 can also use electromagnetic coils 221, each electromagnetic coil 220 has electromagnetic wire coils wound internally along an annular circumference thereof, the electromagnetic wire coils can create an electromagnetic field in the storage space when powered. The uniform magnetization plates of the annular magnetically conductive component 230 can be abutting against the relative electromagnetic coils 221.

The size of the uniform magnetization plate of the annular magnetically conductive component 230 can be larger than an outer dimension of the electromagnetic coil 221, the electromagnetic coil 221 is centrally arranged with the corresponding uniform magnetization plate of the annular magnetically conductive component 230. The uniform magnetization plate of the annular magnetically conductive component 230 expands the magnetic field's range.

Multiple uniform magnetization plates located on the same side of the storage assembly 210 can cover that side's area of the storage space. The uniform magnetization plates located on the top surface of the storage space can cover the top surface area of the storage space, and the uniform magnetization plates located on the bottom surface of the storage space can cover the bottom surface area of the storage space. Due to the reduction of the size of each electromagnetic coil 221, the magnetic field generated by the electromagnetic coil 221 can be more uniform, thereby ensuring that the storage space can be stored with a uniform magnetic field.

The number of magnetic field assemblies 201 can be set according to the size of the storage assembly 210, the structure of the magnetic field freshness-preserving storage container 200 with two magnetic field assemblies 201 is shown, and three or more magnetic field assemblies 201 can be provided as required by a person skilled in the art.

Figure 7:
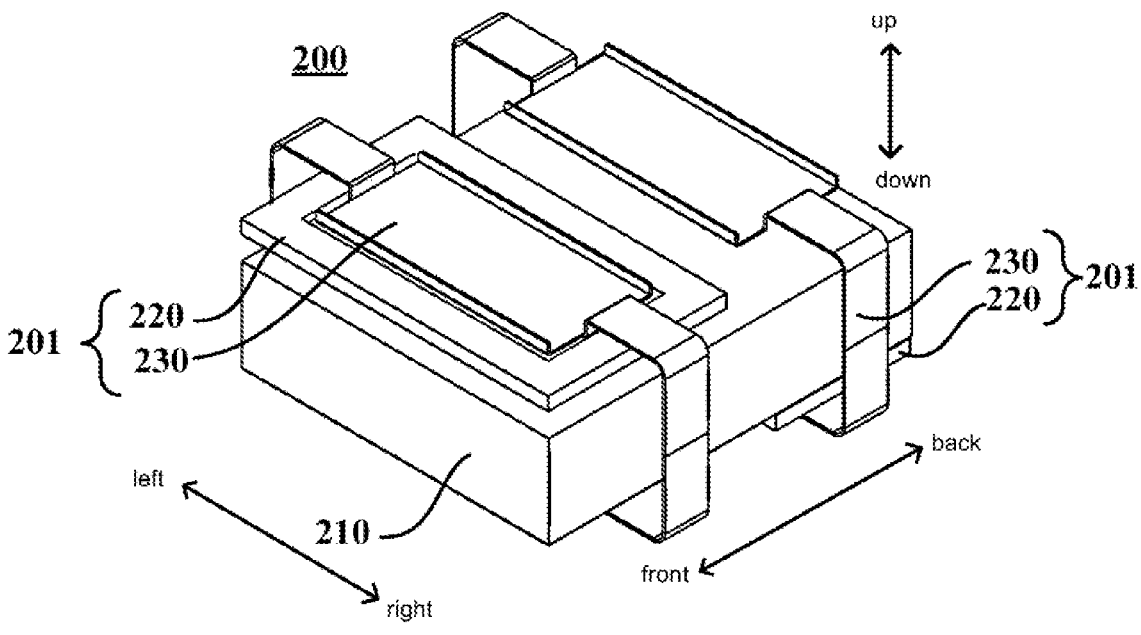
FIG. 7 is a schematic diagram of a magnetic field freshness-preserving storage container according to yet another embodiment of the present invention.
Figure 8:
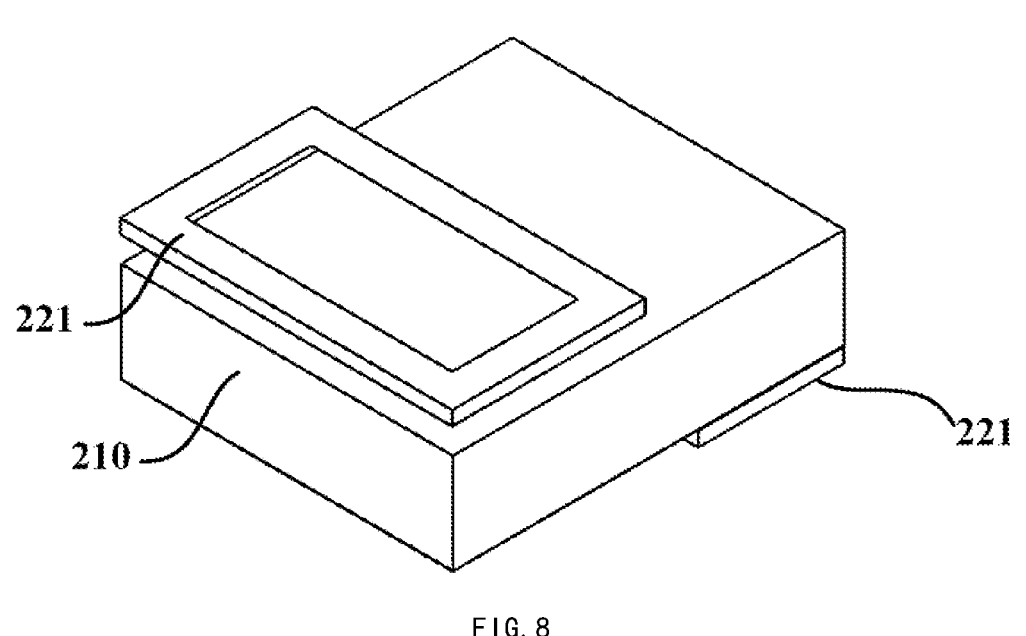
FIG. 8 is a schematic diagram showing the arrangement of magnetic components in the magnetic field freshness-preserving storage container of FIG. 7.

FIG. 7 shows a schematic of the magnetic field freshness-preserving storage container 200 according to another embodiment of the invention. FIG. 8 illustrates the arrangement of magnetic components 220 in the magnetic field freshness-preserving storage container. In this embodiment, there are multiple magnetic field assemblies 201 arranged at intervals along the depth direction or height direction of storage assembly 210. Each magnetic field assembly includes one magnetic component 220. The magnetic component 220 is disposed on a lateral side of the storage assembly 210, and the uniform magnetization plate of the annular magnetically conductive component 230 is arranged correspondingly with the magnetic component 220. The connecting strap of the annular magnetically conductive component 230 is arranged around the storage assembly 210 from one side of the uniform magnetization plate of annular magnetically conductive component 230 to the other.

Multiple magnetic field assemblies 201 can help maintain the uniformity of the magnetic field by arranging magnetic components 220 at different positions. For example, the magnetic components 220 of two adjacent magnetic field assemblies 201 are arranged on the opposite sides of the storage assembly 210.

In an embodiment which having two magnetic field assemblies 201, the magnetic component 220 of the magnetic field assembly 201 located at the front can be arranged on the top side of the storage assembly 210, and the magnetic component 220 of the magnetic field assembly 201 located at the back can be arranged on the bottom side of the storage assembly 210. The magnetic field assembly 201 at the front and the magnetic field assembly 201 at the rear can be arranged symmetrically and have the same construction and dimensions.

The magnetic components 220 of two adjacent magnetic field assemblies 201 are arranged on the opposite sides of the storage assembly 210, for specific structures with four magnetic field assemblies 201 are: the magnetic component 220 of the magnetic field assembly 201 located at the front can be arranged on the top side of the storage assembly 210, the magnetic component 220 of the magnetic field assembly 201 located at the front of the center can be arranged at the bottom side of the storage assembly 210, the magnetic component 220 of the magnetic field assembly 201 located at the back of the center can be arranged at the top side of the storage assembly 210, the magnetic component 220 of the magnetic field assembly 201 located at the back can be arranged on the bottom side of the storage assembly 210.

This configuration of one magnetic component 220 per magnetic component 220 significantly reduces the quantity of magnetic components 220 used and is especially suitable for the storage assembly 210 with smaller storage spaces, while maintaining good magnetic field uniformity through the annular magnetically conductive component 230.

Figure 9:
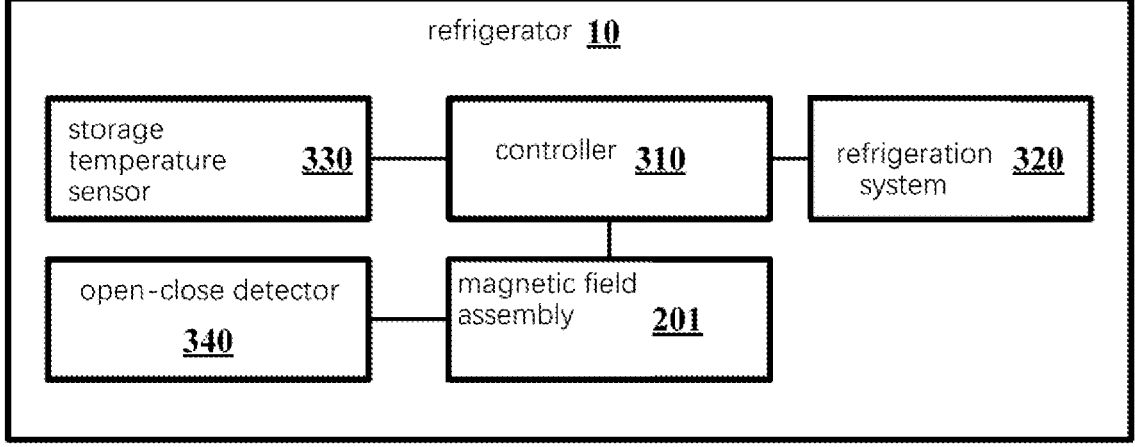
FIG. 9 is a block diagram of a control system for the refrigerator with the magnetic field freshness-preserving storage container according to an embodiment of the present invention.

FIG. 9 is a block diagram of a control system for the refrigerator with the magnetic field freshness-preserving storage container according to an embodiment of this invention.

In this embodiment, the refrigerator 10 can integrate magnetic field control with refrigeration control to ensure effective freezing of food in a magnetic environment, thereby enhancing preservation effectiveness.

The refrigerator 10 can further be equipped with one or more of the following: a storage temperature sensor 330, an open-close detector 340, and a refrigeration controller 310. The storage temperature sensor 330 detects the temperature in the storage space, while the open-close detector 340 monitors the opening and closing status of the storage space.

Upon detecting the opening of the storage space by the open-close detector 340, the storage temperature sensor 330 can determine if new food subjects are added or if existing subjects need re-freezing. During the refrigeration process, the magnetic field assemblies 201 work in conjunction with the refrigeration system 320 to enable magnetically-assisted freezing, thereby improving the freezing and preservation of food subjects.

The controller 310 is responsible for controlling both the magnetic field assemblies 201 and the refrigeration system 320, thus achieving the desired refrigeration and magnetic field control. Various sensors (including the storage temperature sensor 330 and open-close detector 340) provide data for these controls, thereby meeting the control requirements of the control method.

The controller 310 can be configured to control the generation of the electromagnetic field by the magnetic field assemblies 201 based on the temperature in the storage space and the operating state of the refrigerator 10. For example, static magnetic fields with constant magnetic field direction and/or magnetic field strength, alternating magnetic fields with alternating magnetic field direction and/or magnetic field strength, and pulsed magnetic fields with intermittent starts.

For example, when using the magnetic field for assisted freezing storage, the controller 310 can activate the electromagnetic field when new subjects are placed in the storage space and the storage temperature is in a set threshold range. This threshold can be based on the temperature during the crystallization process in freezing, thereby increasing the magnetic field strength during the crystallization process. Moreover, during regular storage, the electromagnetic field can be periodically activated for enhanced magnetic treatment of stored subjects. This control method ensures that the stored subjects are frozen in a strong magnetic field environment, primarily inhibiting the growth of ice crystal nuclei, minimizing cellular damage, preventing juice loss, and ensuring better taste and quality of the frozen subjects, meeting the users' expectations for the storage quality of valuable ingredients.

The refrigerator 10 and its magnetic field freshness-preserving storage container 200 in the present embodiment, by optimizing the structure of the magnetic field assemblies 201, can make the magnetic field freshness-preserving storage container 200 more compact and particularly suitable for storage boxes and drawers in relatively flat storage spaces. The magnetic field assemblies 201 are available in various configurations, chosen based on the structural characteristics of the storage assembly 210, thereby enhancing usability and flexibility.

The refrigerator 10 and its magnetic field freshness-preserving storage container 200 in the present embodiment, under the condition that the magnetic field intensity is increased to make the magnetic field in the storage space more uniform, can reduce the amount of magnetic material used via setting the annular magnetic conductor path, thereby avoiding the cost and weight increase associated with excessive or oversized magnetic components. As verified by prototype products, the magnetic field freshness-preserving storage container 200 can store food subjects in a magnetic field environment, inhibit the growth of ice crystal nuclei, produce smaller ice crystals, thus reducing cellular damage, preventing juice loss, ensuring better taste, and improving the quality of frozen storage, fulfilling the users' quality expectations for storing valuable food subjects.

So far, it should be appreciated by those skilled in the art that while various exemplary embodiments of the invention have been shown and described in detail herein, many other variations or modifications which are consistent with the principles of this invention may be determined or derived directly from the disclosure of the present invention without departing from the spirit and scope of the invention. Accordingly, the scope of the invention should be understood and interpreted to cover all such other variations or modifications.

What is claimed is:

1. A magnetic field freshness-preserving storage container, comprising:
   a storage assembly defining a storage space for placing storage subjects;

one or more magnetic field assemblies surrounding the storage assembly, and each magnetic field assembly comprising:

two magnetic components positioned outside the storage assembly and on opposite sides of the storage assembly to form a magnetic field in the storage space;

an annular magnetically conductive component having a pair of uniform magnetization plates corresponding to the two magnetic components and connecting straps connected to the uniform magnetization plates and arranged around the periphery of the storage assembly, the uniform magnetization plates and the connecting straps forming an annular magnetic conduction path outside the storage space;

wherein the connecting straps include two segments of connecting straps, and each connecting strap extends from an edge of the uniform magnetization plate on one side to an edge of the uniform magnetization plate on the other side along the storage assembly's outer wall;

wherein the connecting straps are strip-shaped, and a width of each connecting strap along a direction perpendicular to an arrangement direction of the two magnetic components is between half to one-tenth of a length of each uniform magnetization plate in the same direction.

2. The magnetic field freshness-preserving storage container according to claim 1, wherein each magnetic component comprises:

an electromagnetic coil having electromagnetic wire coils wound internally along an annular circumference, and when electrified, the electromagnetic wire coils generating an electromagnetic field in the storage space; and the uniform magnetization plates positioned at a central through-hole of the corresponding electromagnetic coil, and uniform magnetization plates matching the central through-hole's shape, or abutting against the electromagnetic coil.

3. The magnetic field freshness-preserving storage container according to claim 1, wherein there is one magnetic field assembly, and the shapes of two magnetic components of the magnetic field assembly is matched with the shape of the side surfaces of the storage assembly which the magnetic components are placed on.

4. The magnetic field freshness-preserving storage container according to claim 3, wherein the storage assembly is flat, and two magnetic components are positioned at top and bottom sides respectively.

5. The magnetic field freshness-preserving storage container according to claim 1, wherein multiple magnetic field assemblies are spaced apart from each other along a depth direction or a height direction of the storage assembly.

6. The magnetic field freshness-preserving storage container according to claim 1, wherein the storage assembly comprises:

a cylindrical body having a forward opening; and a drawer, slidably positioned in the cylindrical body, and forming the storage space therein.

7. A refrigerator, comprising:

a cabinet defining a storage compartment;

the magnetic field freshness-preserving storage container according to claim 1 positioned inside the storage compartment.

8. A magnetic field freshness-preserving storage container, comprising:

a storage assembly defining a storage space for placing storage subjects;

one or more magnetic field assemblies surrounding the storage assembly, and each magnetic field assembly comprising:

one magnetic component positioned outside the storage assembly to form a magnetic field in the storage space;

an annular magnetically conductive component having a pair of uniform magnetization plates corresponding to the magnetic component and connecting straps connected to the uniform magnetization plates and arranged around the periphery of the storage assembly, the uniform magnetization plates and the connecting straps forming an annular magnetic conduction path outside the storage space;

wherein the magnetic components of two adjacent magnetic field assemblies are disposed on opposite sides of the storage assembly;

the connecting straps include two segments of connecting straps, and each connecting strap extends from an edge of the uniform magnetization plate on one side to an edge of the uniform magnetization plate on the other side along the storage assembly's outer wall;

wherein the connecting straps are strip-shaped, and a width of each connecting strap along an arrangement direction of the adjacent magnetic field assemblies is between half to one-tenth of a length of each uniform magnetization plate in the same direction.

* * * * *